Oct. 26, 1937. W. T. SMITH 2,097,351
MOWER MOTOR ASSEMBLY
Filed Jan. 22, 1936 3 Sheets-Sheet 3
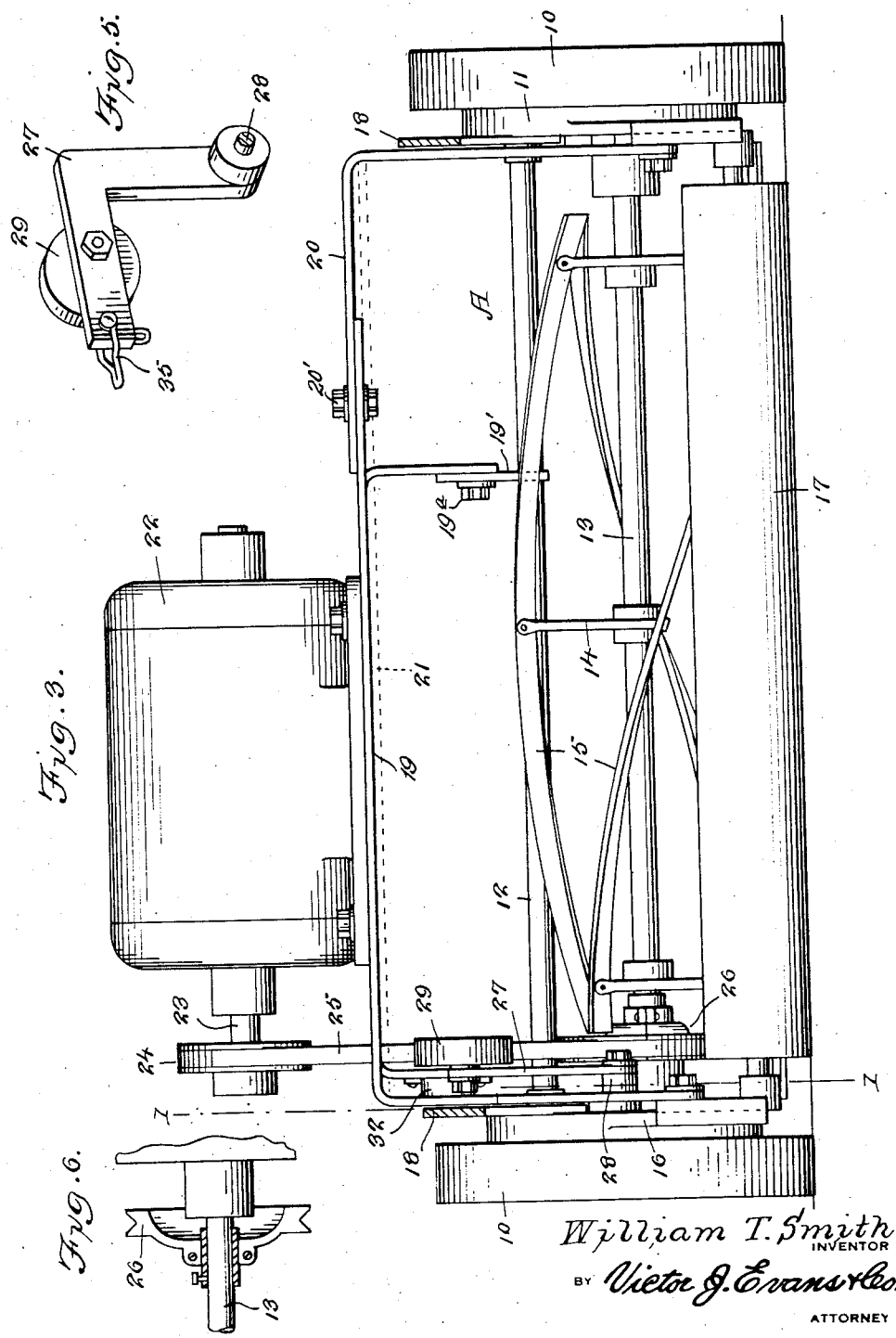
William T. Smith
INVENTOR
BY Victor J. Evans & Co.
ATTORNEY Patented Oct. 26, 1937

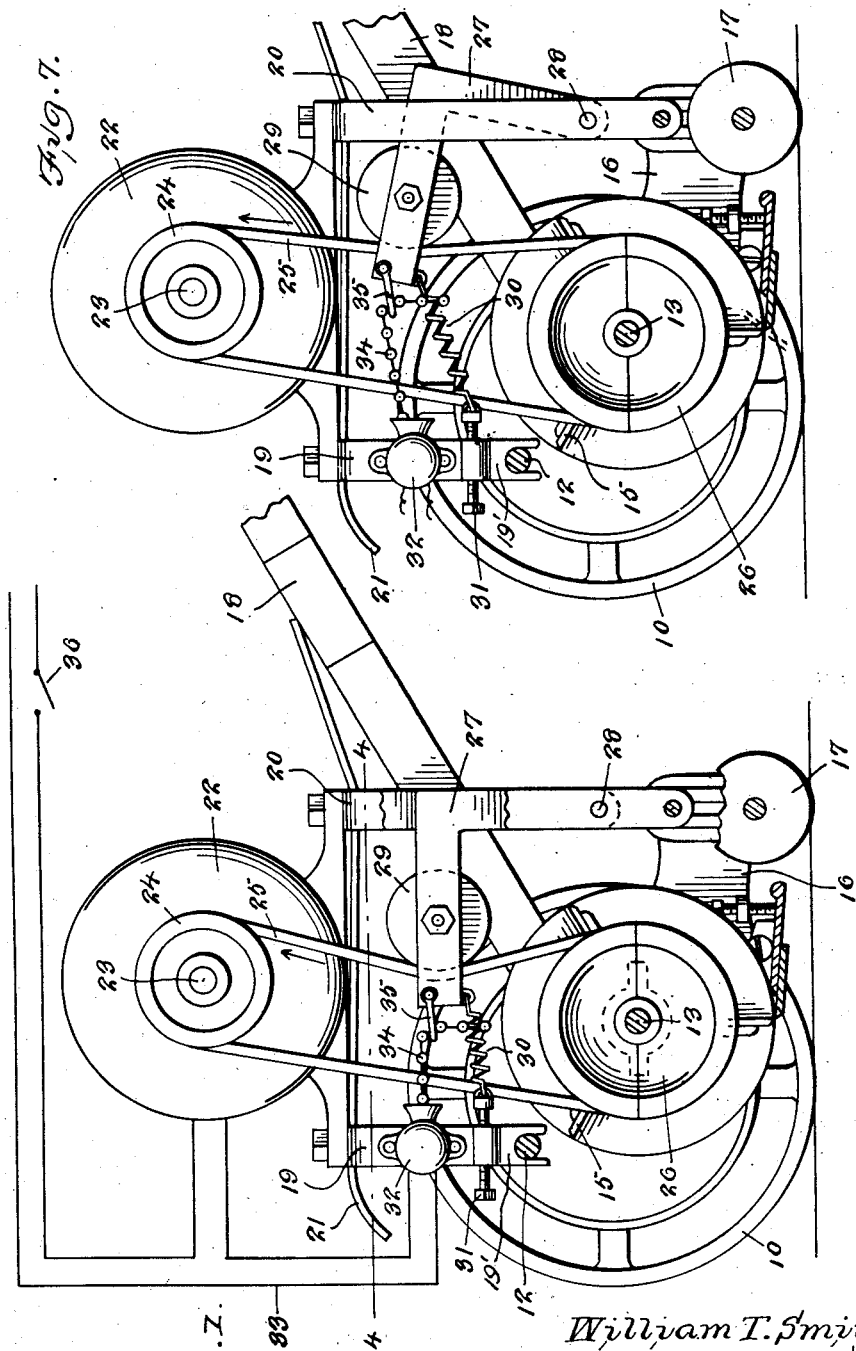

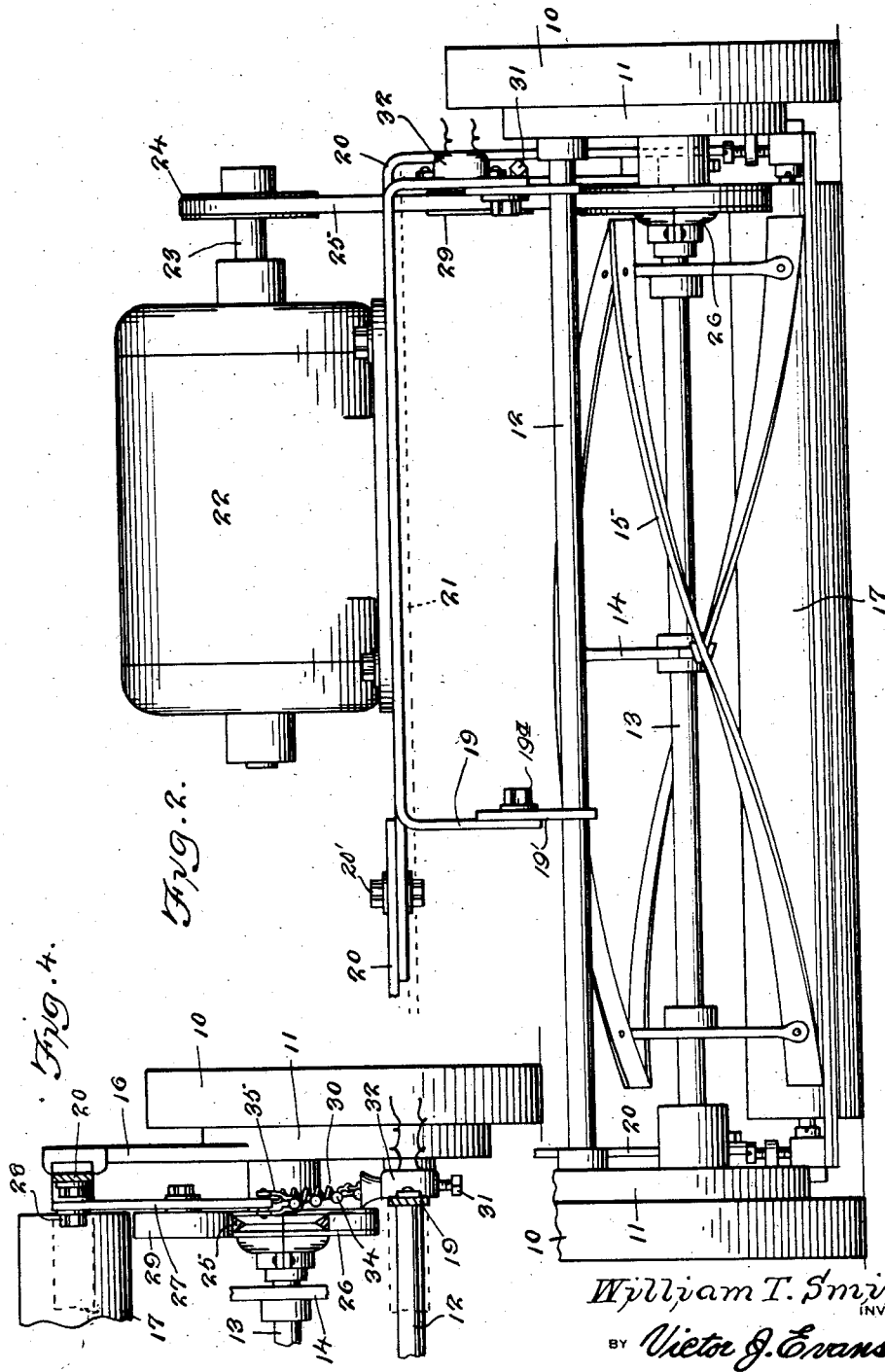

2,097,351

UNITED STATES PATENT OFFICE 2,097,351

MOWER MOTOR ASSEMBLY

William T. Smith, Little Rock, Ark.

Application January 22, 1936, Serial No. 60,307

4 Claims. (Cl. 56—26)

The invention relates to a motor assembly for lawn mowers and more especially to an attachment for driving the rotary cutter of lawn mowers.

The primary object of the invention is the provision of an assembly of this character, wherein a lawn mower of the ordinary type designed and intended to be manually pushed by an operator for the rotation of its cutter can be motor driven for the cutter action of such mower, the motor being of the electrical kind and is operated by electric power through a connection with a source of electrical energy, the assembly being of novel construction so that it may be mounted upon a lawn mower of the conventional hand propelled type without requiring any substantial alteration or change in the original make-up of the mower.

Another object of the invention is the provision of an assembly of this character, wherein the rotary cutter reel having blades when meeting an obstruction resisting the cutting action of the blades will automatically effect the shutting off of the electric motor so as to prevent breakage of the mower or damage to the electric motor resultant from excessive load thereon, the means for the automatic stopping of the motor when the cutter reel meets undue resistance being of novel form and arrangement in the assembly.

A further object of the invention is the provision of an assembly of this character, wherein the support for the motor is susceptible of vertical and horizontal adjustment so as to have such support fit varying sizes of lawn mowers for the carrying of an electric motor thereon utilized in driving the rotary cutter reel of such mower.

A further object of the invention is the provision of an assembly of this character, which is simple of construction, readily and easily mounted on a hand propelled lawn mower or removed therefrom, thoroughly reliable and efficient in its operation, light in weight yet strong, durable and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a side elevation partly in section of a lawn mower showing the motor assembly constructed in accordance with the invention applied thereto and fragmentarily the motor circuit which is diagrammatically illustrated, the section being approximately on the line 1—1 of Figure 3.

Figure 2 is a front elevation of the mower.

Figure 3 is a rear elevation partly in section.

Figure 4 is a fragmentary sectional view on the line 4—4 of Figure 1.

Figure 5 is a perspective view of the L-shaped lever and belt pulley of the assembly.

Figure 6 is a fragmentary sectional view partly in elevation of the rotary cutter belt pulley.

Figure 7 is a view similar to Figure 1 showing the rotary cutter meeting an obstruction and adjuncts in a shifting position.

Similar reference characters indicate corresponding parts throughout the several views in the drawings.

Referring to the drawings in detail, A designates generally a lawn mower of the usual or conventional type which comprises a pair of wheels 10 at the inner sides of which are positioned casings 11, these enclosing the gearing elements of the lawn mower. These casings 11 are connected by the usual cross brace bar 12 and they also carry therebetween the cutter reel shaft 13, the reel being of the blade type and such blades are supported through the medium of radially directed arms or spiders 14, the blades being indicated at 15. These casings are associated with the rearwardly directed arms 16 in which a rear ground roller 17 is journaled. This ground roller 17 is susceptible of adjustment in the arms 16 as the occasion may require. The push or operating handle 18 for the lawn mower is connected at its lower end with the casings 11 in the usual or ordinary manner.

The motor assembly constituting the present invention comprises suitable inverted substantially U-shaped brackets 19 and 20, respectively, the bracket 19 which is the front bracket is susceptible of vertical adjustment at 19a while the bracket 20 which is the rearmost bracket is susceptible of adjustment laterally at 20′ for the lengthening thereof for a purpose presently described. These brackets carry a grass shield 21 and an electric motor 22. This shield 21 is disposed beneath the under sides of the brackets 19 and 20 at the horizontal portions thereof and such shield is suitably constructed to avoid interference with the said brackets particularly at that portion of the bracket 19 where downwardly extended and is held fixed in any suitable manner with the rear portion bent upwardly where the same overlies the push or operating handle 18 sufficiently not to interfere with the vertical swing thereof. The bracket 19 is supported at one end upon and held engaged with the cross bar 12 through the medium of a forked leg 19', its fork accommodating the said bar 12 while its other end is fastened for vertical adjustment to the casing 11 next thereto. The bracket 20 is made fast in any suitable manner to the arms 16 of both casings 11 and by these brackets the lawn mower will be equipped with a support for the motor 22.

The power shaft 23 of the motor 22 has fixed thereto a belt pulley 24 over which is trained a belt 25, the same being also trained over a two-part belt pulley 26 of the kind known as a split pulley suitably fixed to the shaft 13. The two-part formation of the pulley 26 enables the convenient application of this pulley to the shaft 13 without requiring any disassembly of the parts of the lawn mower when applying the assembly thereto.

Swingingly carried by the bracket 20 at one side thereof is an L-shaped lever 27, it being pivoted at one end as at 28 to said bracket for vertical swinging movement and carried by this lever is a belt pulley 29 which presses against the pull stretch of the belt 25, this pulley 29 being on the pull side of said belt and the lever 27 has connection with a tensioning spring 30 which is also connected with an adjusting screw 31 carried in a fixed bearing on the bracket 19 so that the pressure of the pulley 29 on the pull side of the belt can be varied as may be required. Normally the pressure of the pulley 29 upon the pull stretch of the belt 25 under the set tension of the spring 30 causes this pull stretch of the belt to be indented or inwardly flexed and such condition is a normal running condition of such belt.

On the bracket 19 next to the lever 27 is a switch 32 which controls the flow of current through the electric wires 33 to the motor within the casing 22 and this switch 32 is exhibited with a pull chain 34 attached by a coupling 35 with the lever 27 and such switch is closed under normal running conditions of the belt 25. The electric wires 33 are in connection with a source of electric energy and included in this circuit is a hand operated switch 36 so that the electric supply can be cut off or turned on by hand at the option of the user of the lawn mower. The purpose of the switch 32 and its chain 34 connected with the lever 27 is to stop the electric motor when a blade 15 of the cutter meets an obstruction. That is by encountering a stick or similar obstruction which would retard rotation of such cutter and produce a heavy load on the said motor in that the pull stretch of the belt 25 would be caused to straighten and thus the contact of the pulley 29 therewith will swing the lever 27 in a direction to pull the chain 34 and open the switch 32 shutting off current to the said motor for the stopping thereof.

The vertical adjustment of the bracket 19 enables the tightening or slackening of the belt 25 as the occasion may require in that said bracket 19 which is at the front of the mower can be raised or lowered and thus tilting the motor 22 for the tightening or slackening of the said belt. The adjustment of the bracket 20 permits of the mounting of the assembly on lawn mowers of different sizes in conformity with the width thereof.

The shield 21 above the cutter reel protects the motor 22 from cut grass or dirt thrown up by the cutter reel in the operation of the mower.

What is claimed is:

1. A motor assembly for lawn mowers having a rotary cutter shaft, comprising an adjustable support for mounting on the lawn mower, an electric motor secured to said support and having a driving pulley, a two-part pulley secured to the cutter shaft, a belt trained about said pulleys, a snap on and off electrical switch carried by the support and included in an electrical circuit for the motor, and a shiftable member carried by the support engageable with the outside of the pull stretch of the belt to be moved thereby under slackening and tightening of the same and having connection with the said switch.

2. A motor assembly for lawn mowers having a rotary cutter shaft, comprising an adjustable support for mounting on the lawn mower, an electric motor secured to said support and having a driving pulley, a two-part pulley secured to the cutter shaft, a belt trained about said pulleys, a snap on and off electrical switch carried by the support and included in an electrical circuit for the motor, a shiftable member carried by the support engageable with the outside of the pull stretch of the belt to be moved thereby under slackening and tightening of the same, and a pull chain connected with the switch support and said member and operated by the latter when shifted by the belt.

3. A motor assembly for lawn mowers having a rotary cutter shaft, comprising an adjustable support for mounting on the lawn mower, an electric motor secured to said support and having a driving pulley, a two-part pulley secured to the cutter shaft, a belt trained about said pulleys, a snap on and off electrical switch carried by the support and included in an electrical circuit for the motor, a shiftable member carried by the support engageable with the outside of the pull stretch of the belt to be moved thereby under slackening and tightening of the same, a pull chain connected with the switch support and said member and operated by the latter when shifted by the belt, and a roller on the said shiftable member for engaging said belt.

4. A motor assembly for lawn mowers having a rotary cutter shaft, comprising an adjustable support for mounting on the lawn mower, an electric motor secured to said support and having a driving pulley, a two-part pulley secured to the cutter shaft, a belt trained about said pulleys, a snap on and off electrical switch carried by the support and included in an electrical circuit for the motor, a shiftable member carried by the support engageable with the outside of the pull stretch of the belt to be moved thereby under slackening and tightening of the same, a pull chain connected with the switch support and said member and operated by the latter when shifted by the belt, a roller on the said shiftable member for engaging said belt, and means for adjusting the support for proper fitting thereof to the lawn mower.

WILLIAM T. SMITH.